United States Patent [19]

Singh

[11] 3,983,251

[45] Sept. 28, 1976

[54] SOLID ANTIFOAM CRYSTALS FOR DRY BEVERAGE MIXES

[75] Inventor: Gyanendra Singh, Fairfield, Ohio

[73] Assignee: The Procter & Gamble Company, Cincinnati, Ohio

[22] Filed: Dec. 12, 1975

[21] Appl. No.: 640,295

Related U.S. Application Data

[63] Continuation-in-part of Ser. No. 570,333, April 21, 1975, abandoned.

[52] U.S. Cl. ............................... 426/329; 426/590; 426/591
[51] Int. Cl.² ....................... A23L 2/40; A23L 2/26
[58] Field of Search ..................................... 426/591

[56] References Cited

UNITED STATES PATENTS

| | | | |
|---|---|---|---|
| 2,776,892 | 1/1957 | Sandri | 426/590 X |
| 2,953,459 | 9/1960 | Diller | 426/591 |
| 3,719,599 | 3/1973 | Crivellaro | 426/591 |
| 3,821,436 | 6/1974 | Fry | 426/650 |

*Primary Examiner*—Jeanette M. Hunter
*Attorney, Agent, or Firm*—Leonard Williamson

[57] ABSTRACT

A rapidly dissolvable and substantially dry antifoam additive for dry beverage compositions is prepared by dehydrating an aqueous slurry comprising a crystalline sugar, a silicone antifoam agent and a liquid flavorant.

15 Claims, No Drawings

SOLID ANTIFOAM CRYSTALS FOR DRY BEVERAGE MIXES

CROSS-REFERENCE TO RELATED APPLICATION

This application is a continuation-in-part of my commonly-assigned and copending application Ser. No. 570,333 for SOLID ANTIFOAM CRYSTALS FOR DRY BEVERAGE MIXES, filed Apr. 21, 1975 now abandoned.

BACKGROUND OF THE INVENTION

This invention relates to a readily soluble antifoam additive for dry beverage mixes. The readily soluble solid antifoam additive comprises a unique uniform crystalline matrix of crystalline sugar, flavorant and silicone antifoam agent. In part, the present invention relates to a method of incorporating a silicone antifoam agent into a substantially dry and rapidly dissolvable crystalline matrix which form maximizes the effectiveness of the dehydrated silicone antifoam agent incorporated therein.

The preparation of potable beverages, particularly carbonated beverages, by the dissolution of a dry beverage mix in water has been described in the art. Depending upon the nature of the various components included in such mixes, beverages prepared therefrom may be characterized by undesirable or excessive foam formations. These excessive foaming tendencies tend to create an unsightly situation and make the beverage unattractive to the potential consumer, not to mention the mess created by spraying and overflowing of the foam from the container. Numerous approaches have been taken in various arts in an attempt to control undesired foaming. Most notably, polysilicones have been widely accepted and utilized for this purpose. These materials are effective antifoamants and are available for the most part as liquid emulsions which are difficult to dissolve or disperse in water.

The uniform incorporation of a small amount of such materials in a dry composition tends to be hampered by the agglomerating or sticky quality of the antifoamant and by the difficulty in distributing the normally small amount of the antifoamant uniformly through the bulk of the composition.

The preparation of a dry and rapidly dissolvable beverage composition which will provide a potable beverage upon dissolution in water, but which is not characterized by excessive foam formation, involves more than the simple addition of a polysilicone antifoamant to a slurry or solution from which the dry beverage composition is prepared. The preparation of a dry beverage mix which is rapidly dissolvable may be dependent upon the employment of drying conditions which permit the formation of the slurry or solution into a stable foam. Such a foam promotes porosity and rapid dissolution properties. The incorporation of a silicone antifoamant in a dry beverage slurry precursor tends, however, to suppress the desired foam formation with the result that the desired rapid solubility is not achieved.

The desired solubility is complete dissolution within one minute, with at least 90 percent being dissolved within 30 seconds. Also the functionality of the antifoamant is greatly reduced when the antifoamant is added to such a precursor.

THE SUMMARY OF THE INVENTION

The present invention is based in part upon the discovery that a potable beverage, prepared by addition of water to a dry mix and which does not foam excessively, can be realized by including in the dry mix a novel antifoaming additive in the form of a substantially dry crystalline matrix of crystalline sugar, flavorant and silicone antifoamant.

In its process aspect, the present invention is based on a method of making a rapidly dissolvable and substantially dry additive for dry beverage compositions comprising the steps of (a) uniformly dispersing a silicone antifoam agent in a liquid flavorant using water to make a homogeneous solution, (b) mixing said solution with a crystalline sugar to form a uniform slurry, and (c) dehydrating said slurry in such a manner so as to form a substantially dry, homogeneous and rapidly dissolvable water-soluble antifoam crystalline matrix.

DESCRIPTION OF THE INVENTION

In accordance with the present invention, the silicone antifoam agent is first uniformly dispersed in a liquid flavorant or an essential oil using water to make a homogeneous solution. The solution is then mixed with a crystalline sugar carrier to form a uniform slurry. The uniform slurry is then dehydrated in such a manner so as to form substantially dry homogeneous and rapidly water-soluble antifoam crystalline matrix. The final moisture content therein is 3 percent or less.

The antifoam additive operates to prevent unsightly foam from rising out of the glass when a dry beverage mix is used. The main ingredient of the present invention is, of course, an edible silicone antifoam agent, or antifoamant. As used herein, silicone means polysilicones or organopolysiloxanes of various types which are known to be useful as edible antifoaming agents. Some examples of commercial silicone antifoamants are DC Antifoam A and dehydrated DC Antifoam AF, both products of the Dow Corning Corporation of Midland, Michigan.

Organo-polysiloxanes which function satisfactorily as antifoamants are of the formula:

$$Si_nO_{n-1}R_{2n+2}$$

where $n$ is an integer and R is any single alkyl or aryl group or combination thereof, that is, different R groups may be combined in a single organo-polysiloxane to add up to the total numer of R groups required by the formula. The alkyl groups may be saturated or unsaturated, for example, they may be methyl ethyl, propyl, butyl, amyl, hexyl, heptyl, octyl, decyl, dodecyl, vinyl, and allyl. Examples of the aryl group are phenyl, toluyl and naphthyl.

It may be mentioned that in commercial silicones n reaches very high values and the chain is so long that the values of n are not used to denote the compounds, but rather physical properties are employed for this purpose. The physical property commonly employed is viscosity. Silicones of all viscosities have been found to operate in the practice of this invention, even as high as 100,000 centistokes.

Silicone antifoam agents which function most satisfactorily in the present practice of the invention are a mixture of alkyl silicones such as described above and an unsubstituted silica. DC Antifoam A, for example, is a physical mixture of dimethyl polysiloxane (specific gravity 0.95 plus or minus 0.05) and finely divided silica. A silicone antifoam agent such as the one described is characterized by its ability when present in a liquid to prevent or suppress foam, or alter the nature of the foam. However, in accordance with the present invention the antifoam agent is used as a dry solid incorporated in a crystalline sugar-flavor matrix. The silicone antifoamant comprises from 0.1 to 3% by weight of the antifoam additive. Preferably, the silicone material will be present in an amount of from 0.15 to 2 percent.

The flavor concentrate, commonly called a flavor base or flavorant, is used primarily as a dispersing agent for the silicone antifoam agent. Formulations of various flavor bases are well known to those skilled in the art and may readily be obtained from published sources. For example, Merory, *Food Flavorings*, The Avi Publishing Company (1960), lists various flavor base formulations and essential oils in Chapter 17, entitled "Syrup and Soda Flavorings"; also, in Jacobs, M.B., *Manufacturing and Analysis of Carbonated Beverages*, Chemical Publishing Company (1959), formulations for many fruit and non-fruit flavor bases and essential oils are given. In accordance with the present invention, the silicone antifoam agent is dispersed in a flavorant or essential oil. The flavorant comprises from about 0.2 to about 10% by weight of the antifoam additive after drying. Preferably, the resulting product will contain from 1 to about 5% by weight of flavorant material. As those skilled in the art will appreciate, the flavorant used to make the antifoam additive may correspond with the flavorant used in the dry beverage mix.

Complete flavor bases are also commercially available in standardized concentrations for ease in dilution to the proper concentration for the final beverage. These are commonly known as "2-ounce" or "4-ounce" flavor bases depending upon the amount of the base which must be added to a gallon of simple syrup which is then diluted with water to the final beverage strength. (As those skilled in the art will appreciate, a simple syrup is a solution of sugar in water, usually in a standard concentration.) Commercially obtained flavor bases are typically about 50 percent solvent, usually water or ethanol, with the flavor components typical for a particular flavor dissolved therein.

Some of the more common flavoring ingredients which can be added to an essential oil or flavorant include, for example, extract of coca leaves, neroli oil, lime oil, lemon oil, orange oil, nutmeg oil, vanilla extract or cassia oil. Other flavoring materials for colas or any other desired flavor base may be found in published formulation recipes for the particular beverage flavor desired. Other types of materials, such as food colorings, for example, U.S. Certified Food Colors or caramel coloring; stimulants, for example, caffeine; or preservatives, for example, sodium benzoate, glycerine, propylene glycol or ascorbic acid may advantageously be added to the flavor base to achieve the respective desired results. Alternatively, if the flavor base is formulated specifically for processing into a dry antifoam additive in accordance with the present invention, standard flavor base formulations may be directly adapted for use by the addition of any desired optional ingredient not set forth in the standard formulation.

Various substances may be optionally added to the mixture in processing. The only criteria that limits the possible inclusion of any optional ingredient is that it must be acceptable for the use in edible food products. Other than this restriction, only the appearance of an undesirable off-base or off-color for the particular beverage will place a practical limitation on the addition of any desired material. As those skilled in the art will appreciate, the variety of different materials which may be added is extremely broad indeed. Some examples of optional materials include the more common flavoring ingredients shown above. Any common food acid such as citric, malic or phosphoric may be used. Alternatively, if the flavorant is formulated specifically for a particular type of dry beverage mix in which the antifoam additive is to be used, standard flavorant formulations may be directly adapted for such use by the addition of any desired optional ingredients not set forth in the standard formulation.

The admixture of flavorant, antifoamant, sugar and any optional ingredients is dried to substantial dryness using conventional vacuum or freeze-drying techniques to produce a substantially dry, crystalline matrix. As used herein, "substantial dryness" is the state at which the dried material feels dry to the touch, is free-flowing after being ground and can be packaged similarly to conventional powders or granules without a coating and without adhering to the package sidewalls. This will typically involve drying to a final moisture content of 3 percent or less. The amounts of each of the silicone anti-foamant, flavorant and sugar components employed in the preparation of a slurry suitable for drying to the antifoaming additive of the invention will be amounts sufficient to provide in the dried additive the respective amounts of such components described herein. The requisite amounts are readily determinable and can be suitably adjusted consistent with the desired amount of each component in the dried additive. In keeping with the present invention, it is important that the slurry be dried by vacuum drying or equivalent techniques which causes the drying material to form a stable foam so as to form a crystalline structure which is rapidly dissolvable in water requiring little or no agitation. In the practice of the present invention, the slurry is placed in a relatively thin layer on a belt conveyor or on trays and dried under vacuum conditions. The slurry may be frozen before drying, but in any event, it is important that the integrity of a porous physical structure be retained during the evaporation of moisture. Specific drying techniques are known to those skilled in the art and will not be repeated herein for the purpose of brevity. It has been found that the best results are obtained if the slurry is dried within a period of about 24 hours and preferably about 3 hours. The temperature of the slurry should be kept below 100°F and preferably below 75°F during the drying process. In the practice of the present invention, any of the conventional freeze-drying techniques known to those skilled in the art are suitable for the practice of the present invention so long as a stable foam is produced from the slurry during the dehydration.

The dried product resulting from the dehydration step is then ground by conventional size reduction techniques so as to make it more readily soluble when added to water and to enhance the appearance of the final product. After grinding to a suitable particle size, the solid antifoam crystals can be mixed with dry flavor crystals and packaged in suitable adequate portions for subsequent dissolution in a predetermined amount of water to obtain a foam-controlled beverage ready for direct consumption.

The solid antifoam crystals of the present invention may be made a part of a dry carbonated beverage mix. If the dry antifoam crystals of the present invention are to be used in a dry mix adapted for making carbonated beverages, the dry antifoam crystals may be advantageously employed with a variety of carbonation systems to provide suitably carbonated, foam-controlled beverages. For instance, the dry antifoam crystals as disclosed herein can be added along with dry beverage crystals to pre-carbonated water, or used with an economical point-of-consumption carbonation system which utilizes tap water to provide a convenient carbonated beverage. Examples of suitable sources of pre-carbonated water include bottled pre-carbonated water, commonly known as club soda. Pressure carbonators which utilize $CO_2$-charged cylinders to carbonate water as it is dispensed, such as at soda fountains, can be employed. Examples of point-of-consumption systems which utilize regular tap water for the beverage includes the use of a "chemical couple" such as those disclosed in Mitchell et al., U.S. Pat. No. 3,241,977, issued Mar. 22, 1966, or the use of $CO_2$-loaded zeolite molecular sieves such as those disclosed in pending U.S. Patent application, Ser. No. 302,149, filed Oct. 30, 1972, and incorporated herein by reference to its entirety.

In accordance with the present invention sucrose is the preferred sugar used in this invention because of its crystallinity and solubility in water. The resulting crystalline matrix containing the antifoam and the flavorant is theorized to be rapidly dissolvable because of its unstable structure. That is to say, that its structure is more unstable than either the flavor base or the silicone antifoam agent. The dry antifoam additive of the present invention is described as a crystalline matrix because the individual ingredients are indistinguishable. Thus, the crystalline matrix is more than a mere mixture.

The antifoam additive of the present invention comprises by weight, from 0.1 to 3% antifoamant, from 0.2 to 10% flavorant, less than about 3% moisture and the balance, essentially, crystalline sugar. Preferably, the additive will comprise from 0.15 to 2% antifoamant, 1 to 5% flavorant, 3% or less moisture and the balance, essentially, sugar.

The antifoam additive of the present invention may be used in dry beverage mixes by simply mixing the antifoam additive with the remaining ingredients of the dry beverage mix. It will be appreciated that the amount of antifoam additive employed in a dry beverage mix will depend upon the nature of the beverage mix to which it is added and its propensity to generate foam upon addition of water and preparation of a beverage. Accordingly, the antifoam additive will be employed in an amount sufficient to reduce the foaming tendencies of the beverage composition to which it is added. Normally, the employment of crystalline antifoam additive in an amount by weight of the total dry beverage mix of from 0.25 to 6% will be sufficient to provide control of foaming tendencies, although other amounts may be employed depending upon the particular nature of the beverage mix.

EXAMPLE 1

Three grams of a commercially available methyl silicone antifoaming agent having 30% silicone in water (Dow Corning Antifoam AF emulsion, supplied by the Dow Corning Corporation, Midland, Michigan) was mixed intensively with 22.2 grams of flavorants (42% water) containing a commercially available 2-oz. cola base and 29 grams of water to make a homogeneous solution. The solution was then stirred with 500 grams of sugar. The resulting slurry was then spread on stainless steel pans and vacuum-dried for three hours at 75°F and 5 mm of mercury in a Stokes Freeze Dryer (supplied by Equipment Division, Pennsalt Chemicals, Philadelphia, Penna.). Dried crystalline material in an amount of 525.2 g. was recovered and was ground and sieved to obtain crystals of desired size. Moisture level was calculated to be 2.18%. The solid antifoam crystals contained 1714 ppm of methyl silicone. The solid antifoam crystals (60 mg.) were mixed with 6 g. of dry beverage crystals and the resulting mix was added to a 12-oz. cup having a molecular sieve carbonation device. Water (8 oz.) and ice were added to fill the cup. The amount of silicone, by weight of the beverage including ice, was calculated to be 0.3 ppm.

The antifoam crystals in the beverage mix reduced the amount of beverage foaming relative to a control which did not contain the antifoam crystals. Increasing or decreasing the level of antifoam crystals has a direct effect on the results obtained, making it possible to "tailor" the foam characteristics of the resulting product.

EXAMPLE 2

Ten grams of a commercially available methyl silicone antifoaming agent having 30% silicone in water (Dow Corning Antifoam AF emulsion, supplied by the Dow Corning Corporation, Midland, Michigan) was mixed intensively with 12.2 grams of flavorants (36% water) and 29 grams of water to make a homogeneous solution. The solution was then stirred with 500 grams of sugar. The resulting slurry was then spread on stainless steel pans and vacuum dried for 3 hours at 75°F and 5 mm of mercury in a Stokes Freeze Dryer (supplied by Equipment Division, Pennsalt Chemicals, Philadelphia, Penna.). Dried crystalline material having a moisture content of approximately 2% was recovered. The crystalline material was ground and sieved to obtain crystals of desired size. The composition (dry basis) of the solid antifoam crystals was as follows:

|  | % |
| --- | --- |
| Flavorants (cola) | 1.53 |
| Methyl silicone | 0.59 |
| Sugar (sucrose) | 97.88 |

The solid antifoam crystals of Example 2 were used with a diet dry beverage mix made using the process outlined in copending patent application, "Dry Low Calorie Beverage Crystals," Philip J. Shires and Timothy J. Kennedy, Ser. No. 570,332, filed Apr. 21, 1975, incorporated herein by reference. Solid antifoam crystals (0.1 g.) were added to 1.7 g. of the diet dry beverage crystals and the resulting mix was added to a 12-oz. cup containing a carbonation device. Water (8 oz.) and ice were added to fill the cup. The silicone, by weight of the beverage including ice, was calculated to be 1.66 ppm. The presence of the antifoam crystals was seen to eliminate the excessive foaming in the diet beverage caused by the surface activity of the synthetic sweetener. It should be pointed out that aspartame, the synthetic sweetener, is not likely to be satisfactory as a sweetener for beverages in the absence of an antifoaming agent due to the excessive foaming that results from the surface active nature of such artificial sweeteners.

Diet flavor crystals were made with the antifoam agent added directly to the flavor/sugar slurry prior to the drying step. Two effects were noticed: (1) the diet flavor crystals did not dissolve as quickly as had been the case in the absence of the antifoaming agent; (2) the resulting mix did not exhibit the controlled foam obtained by separate use of an equivalent amount of antifoam incorporated in the solid antifoam crystals.

It will be appreciated that the functionality of the antifoam additive will depend upon the amount of silicone antifoamant in the additive, upon the nature of the beverage mix to which the additive is added, and upon the amount of additive employed. Suitable effective foam-controlling amounts can, however, be readily determined.

EXAMPLE 3

Same as Example 1 except that typical freeze-drying conditions of freezing at −50°F, prior to drying at 50°F and 5 mm pressure for 8 hours were employed. No significant differences were observed at the level at which the resulting solid antifoam crystals were used.

It is judged that both freeze- or vacuum-drying may be employed satisfactorily in the production of the said crystals over a wide range of temperatures.

EXAMPLE 4

Same as Example 2 except Dow Corning Antifoam C emulsion was employed. It appeared to be as good as Antifoam AF emulsion used in Example 2. It is theorized that most commercial silicone antifoaming agents can be successfully incorporated in the solid antifoam crystals.

EXAMPLE 5

Two grams of the solid antifoam crystals prepared in Example 1 were used in a pressurized container containing a quart (32 oz.) of carbonated beverage at a carbonation level of approximately 2.3 by volume, providing 3.8 ppm antifoamant therein. The beverage was dispensed without specialized valves commonly used by the soft drink industry. The addition of antifoam additive was observed to provide reduction of the amount of foaming relative to the amount of foam observed in the case were antifoam additive was not employed.

What is claimed is:
1. A rapidly dissolvable and substantially dry antifoam additive for dry beverage compositions comprising a uniform crystalline matrix of crystalline sugar, flavorant and silicone antifoam agent.
2. An antifoam additive in accordance with claim 1 wherein said silicone antifoam agent comprises from 0.1 to 3% by weight of said antifoam additive.
3. An antifoam additive in accordance with claim 1 wherein said flavorant comprises from 0.2 to 10% by weight of said antifoam additive.
4. An antifoam additive in accordance with claim 1 wherein said flavorant comprises from 1 to 5% by weight of said antifoam additive.
5. An antifoam additive in accordance with claim 1 wherein said crystalline sugar is sucrose.
6. A method of making solid antifoam additive comprising the steps of
   a. uniformly dispersing a silicone antifoam agent in a liquid flavorant using water to make a homogeneous solution;
   b. mixing said solution with a crystalline sugar to form a uniform slurry; and
   c. dehydrating said slurry in such a manner so as to form substantially dry, homogeneous and rapidly water-soluble solid antifoam crystalline matrix wherein the final moisture content therein is 3% or less.
7. A method of making solid antifoam additive in accordance with claim 6 wherein said slurry is dehydrated by vacuum drying.
8. A method of making solid antifoam additive in accordance with claim 6 wherein said silicone antifoam agent is employed in said slurry in an amount sufficient to provide from 0.1 to 3% silicone antifoamant by weight of said antifoam additive.
9. A method of making solid antifoam additive in accordance with claim 8 wherein said silicone antifoam agent comprises from 0.15 to 2%.
10. A method of making solid antifoam additive in accordance with claim 6 wherein said flavorant is employed in said slurry in an amount sufficient to provide from 0.2 to 10% flavorant by weight of said antifoam additive.
11. A method of making solid antifoam additive in accordance with claim 10 wherein said flavorant comprises from 1 to 5%.
12. A method of making solid antifoam additive in accordance with claim 6 wherein said flavorant is a cola-base material.
13. A method of making solid antifoam additive in accordance with claim 6 wherein said crystalline sugar is sucrose.
14. A substantially dry rapidly-dissolvable beverage mix suitable for the preparation of a potable beverage upon dissolution in water and free from excessive foaming tendencies comprising a dry beverage mix and an effective amount of a substantially dry crystalline antifoam matrix of crystalline sugar, flavorant and silicone antifoam agent.
15. A substantially dry rapidly-dissolvable beverage mix in accordance with claim 14 wherein said beverage mix and said antifoam matrix are cola-based materials.

* * * * *